Jan. 22, 1946.　　　A. H. BEEDE　　　2,393,511
CORD WINDER
Filed June 30, 1944　　　2 Sheets-Sheet 1
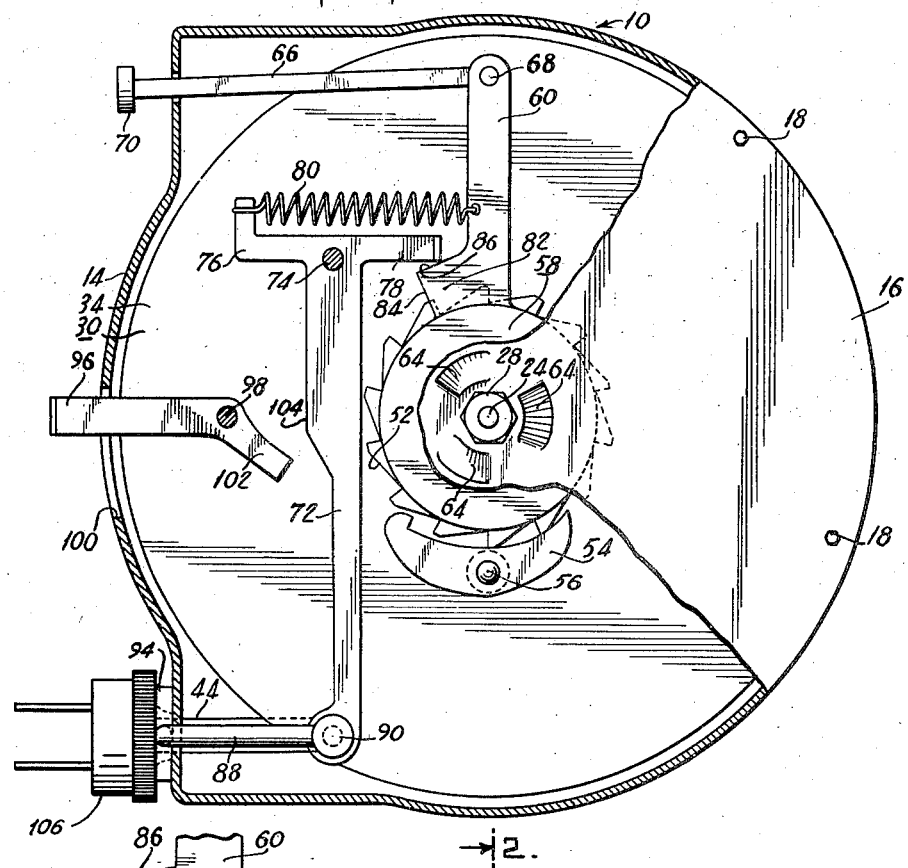
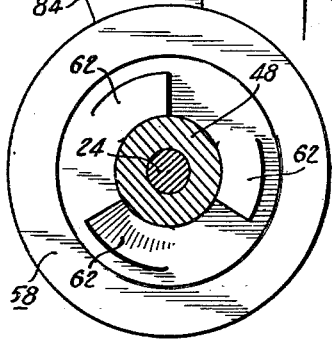
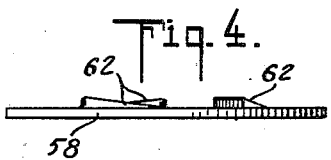
INVENTOR
Arnold H. Beede
BY
Thomas C. Betts
his ATTORNEY Jan. 22, 1946.  A. H. BEEDE  2,393,511
CORD WINDER
Filed June 30, 1944   2 Sheets-Sheet 2

INVENTOR
Arnold H. Beede
BY
Thomas C. Bitts
his ATTORNEY

Patented Jan. 22, 1946

2,393,511

UNITED STATES PATENT OFFICE 2,393,511

CORD WINDER

Arnold H. Beede, Fairfield, Conn., assignor to Electrolux Corporation, Old Greenwich, Conn., a corporation of Delaware Application June 30, 1944, Serial No. 542,858

9 Claims. (Cl. 242—107)

My invention relates to a cord winder for winding up any flexible cord, such as the electric cord on a vacuum cleaner.

One of the objects of my invention is to provide an improved mechanism for controlling the rotation of the reel upon which the cord is wound. The reel is usually rotated in a direction to wind the cord thereon by means of a rewind spring, which is wound up by rotation of the reel in the opposite direction when the cord is pulled off the reel. Inasmuch as the spring always tends to wind up the cord, suitable brake means under the control of the operator must be provided to hold the reel against rotation by the spring. In accordance with my invention, the brake means may be released by a single momentary manual impulse and is again applied by an impulse, which may be given manually if it is desired to stop the rewinding before the cord is completely rewound, and otherwise is given automatically upon completion of the rewinding. Thus, when complete rewinding is desired, only a single manual impulse is required, the device thereafter being entirely automatic in operation. Moreover, in accordance with my invention, the brake may be released by a momentary manual impulse as soon as the cord has been pulled out and attached to an electric outlet, whereupon the reel tends to wind up the cord, thus taking up any slack between the reel and the outlet. Consequently, if the device on which the reel is mounted is moved further away from the outlet, cord is payed out, while if the device is moved closer to the outlet, the reel takes up the slack, thus keeping the cord straight and preventing excess cord from lying on the floor.

Further objects and advantages will be apparent from the following description considered in connection with the accompanying drawings which form a part of this specification and of which:

Fig. 1 is a top view of a preferred embodiment of my invention with a portion of the casing broken away to reveal the mechanism;

Fig. 3 is a cross-sectional view taken on the line 3—3 of Fig. 2;

Fig. 4 is an end view of the elements shown in Fig. 3; and

Figure 2:
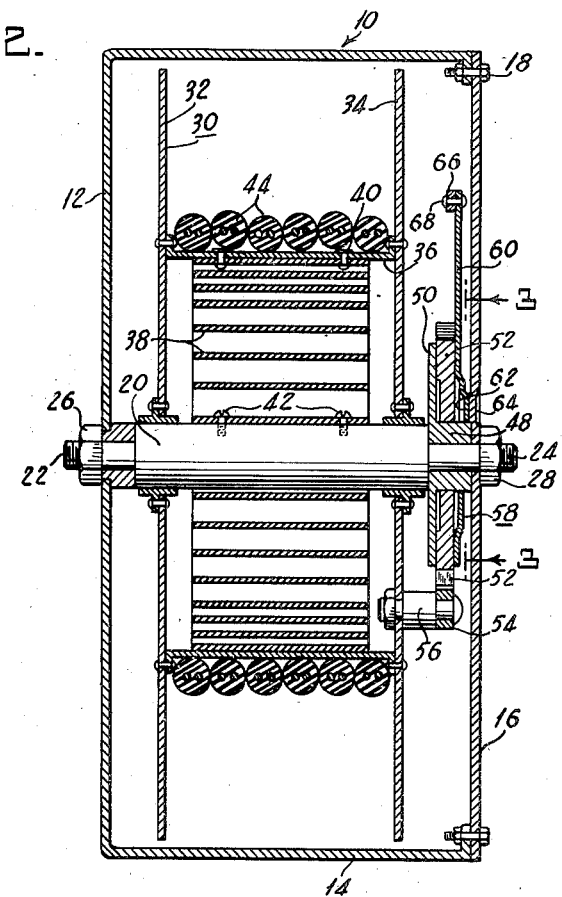
Fig. 2 is a cross-sectional view taken on the line 2—2 of Fig. 1.

Referring to the drawings, reference character 10 designates generally a casing including a rear wall 12, a curved side wall 14 and a front wall 16. As shown more particularly in Fig. 2, the rear wall 12 may be integral with the side wall 14, while the front wall 16 may be removably secured to the side wall, as by means of bolts 18. A central shaft 20 is formed with threaded end portions 22 and 24 of reduced diameter which extend through suitable openings in the front and rear walls, respectively. Nuts 26 and 28 serve to rigidly secure the shaft 20 to these walls.

Figure 5:
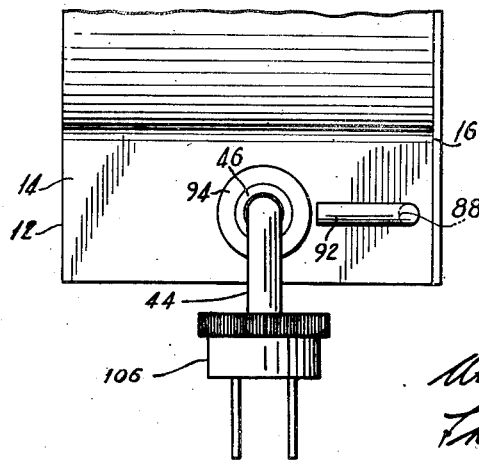
Fig. 5 is an exterior view of the lower portion of the device as seen from the left of Fig. 1, but with the cord pulled out a short distance.

Rotatably mounted on the shaft is a reel 30 comprising circular discs 32 and 34 joined together by means of a cylindrical hub member 36. A spiral spring 38 has its outer end secured to the hub, as by means of rivets 40, while its inner end is anchored to the shaft 20, as by means of screws 42. An electric cord 44 is adapted to be wound on the hub 36 and between the discs 32 and 34. The side wall 14 is formed with an opening 46 shown in Fig. 5 through which the cord 44 may pass during winding or unwinding thereof.

A bushing 48 is fixed on the reduced portion 24 of the shaft 20 by being clamped between the top plate 16 and the shoulder on the shaft. This bushing has a radially extending flange 50. Rotatably mounted on the bushing 48 is a ratchet wheel 52. A double ended pawl 54 is pivotally mounted on a pin 56 secured to the disc 34 of the reel 30 in such a position that the pawl cooperates with the ratchet in a manner permitting the reel, on which the pawl is mounted, to rotate in a clockwise direction relative to the ratchet, while preventing counter-clockwise rotation of the reel relative to the ratchet. As the pawl moves clockwise around the ratchet, first one end and then the other of the pawl is moved radially outwardly by the inclined faces of the ratchet teeth, thus causing the pawl to oscillate on the pin 56. Whenever the pawl tends to move in counter-clockwise direction around the ratchet, one or the other of the ends of the pawl is bound to be in a position to engage the radial surface of a tooth, thus arresting further movement of the pawl.

Pivotally mounted on the bushing 48 between the ratchet 52 and the front wall 16 is a generally circular brake member 58 having an actuating arm 60. The face of the brake member 58 which is adjacent to the wall 16 is formed with a plurality of inclined surfaces 62, shown more particularly in Figs. 3 and 4. The inner surface of the wall 16 is formed with similar inclined surfaces 64 which are inclined in an opposite direction from the surfaces on the brake member. These surfaces may be formed by striking out arcuate tabs from the wall 16 and brake member 58 and are arranged to cooperate in such a way that, when the brake member is pivoted about the bushing 48 the surfaces 62 on the brake member slide up on the surfaces 64 on the wall 16, thus displacing the brake member axially along the bushing and forcing it into frictional engagement with the adjacent radial face of the ratchet wheel 52. Consequently, the ratchet wheel is clamped between the brake member and the flange 50 on the bushing and is thus held stationary.

A link 66 is pivotally secured at 68 to the arm 60, and extends through a suitable opening formed in the side wall 14, the outer end of the link being provided with a button or the like 70. A lever 72 is pivotally mounted on a pin 74 carried by the front wall 16. This lever includes arms 76 and 78 extending at right angles to the rest of the lever in the neighborhood of the pin 74. A tension spring 80 is connected between the arm 76 and the brake arm 60, and tends to draw these two arms towards each other. The brake arm is provided with an extension 82 having a radial surface 84 and an arcuate surface 86. With the parts in the position shown in Fig. 1, the end of arm 78 contacts the arcuate surface 86, thus preventing pivoting of the lever 72 in a clockwise direction under the influence of the spring 80. However, if the brake arm 60 is pivoted in a clockwise direction, the end of arm 78 will ride on the arcuate surface 86, until this surface passes beyond the end of the arm, whereupon the spring 80 pivots the lever 72 in a clockwise direction, bringing the end of the arm 78 into engagement with the radial surface 84. This locks the brake arm in the position to which it has been pivoted.

A link 88 is pivoted at 90 to the lower end of lever 72. The link extends through a suitable opening in the wall 14 of the casing and has an arm 92 extending at right angles therefrom which terminates adjacent to a bushing 94 secured to the side wall 14 and in which is formed the opening 46, the cord 44 extending through the bushing, as is shown more particularly in Fig. 5.

If desired, a lever 96 may be pivotally mounted on a pin 98 carried by the front wall 16. One end of this lever extends through a slot 100 formed in the side wall 14, while the other end of the lever is formed as a nose 102 which may be pivoted into engagement with a surface 104 formed on the lever 72. With the parts in the position shown in Fig. 1, the lever 96 has no effect on the lever 72, but if the lever 96 is pivoted in a counter-clockwise direction so that the nose 102 contacts the surface 104, the lever 72 is thus prevented from pivoting in a clockwise direction when the arcuate surface 86 on the brake arm 60 passes beyond the end of the arm 78, and hence the arm 78 cannot move down to engage the radial surface 84 on the brake arm. Consequently, the brake arm will not be locked, but will be free to pivot in a counter-clockwise direction under the influence of spring 80.

The above described device operates as follows.

It will be assumed that the cord 44 is completely wound on the reel, with the exception of the length of cord necessary to extend out through the opening 46. The usual enlarged electric plug 106 connected to the end of the cord prevents the latter from being drawn completely into the casing. With the cord thus wound on the reel 30, the spring 38 will be unwound. When it is desired to unwind the cord from the reel, the plug 106 is grasped and pulled outwardly. This causes the reel to rotate in a clockwise direction, as viewed in Fig. 1. As the reel rotates, the pawl 54, which is pivotally secured to the reel by means of pin 56, travels around the stationary ratchet, the pawl oscillating as the ends thereof pass over the teeth of the ratchet. As above described, this operation of the ratchet mechanism is substantially silent and results in practically no wear of the parts. When the desired amount of cord has thus been unwound from the reel, the pull on the cord is relieved, and the spring 38 immediately tends to rotate the reel 30 in a counter-clockwise direction. However, one or the other of the ends of the pawl 54 engages a tooth on the stationary ratchet 52, thus preventing rewinding of the cord.

When it is desired to rewind the cord, the operator depresses the button 70, thus pivoting the brake arm 60 in a clockwise direction, as viewed in Fig. 1. This pivoting of the brake arm 60 and the brake member 58 permits the inclined surfaces on the latter to slide down on the inclined surfaces 64 on the front wall 16, thus permitting the brake member to be displaced axially to the right, as viewed in Fig. 2, which relieves the clamping or braking pressure applied to the ratchet 52. The ratchet is hence free to rotate and the ratchet and pawl rotate as a unit under the influence of the spring 38.

Pivoting of the brake arm 60 in a clockwise direction permits the arm 78 of lever 72 to be pulled down by the spring 80 into engagement with the radial surface 84 on the brake arm (provided the lever 96 is in the position shown in Fig. 1) to thus lock the brake arm, hence preventing pivoting of the arm in a counter-clockwise direction under the influence of the spring 80. Consequently, pressure on the button 70 may be relieved without the brake being applied.

Pivoting of the lever 72 in a clockwise direction causes the link 88 and arm 92 to move outwardly from the wall 14 and beyond the bushing 94. As the cord is rewound it passes through this bushing until the plug 106 strikes the arm 92. The resulting impact is sufficient to pivot the lever 72 in a counter-clockwise direction, thus moving the arm 78 outwardly along the radial surface 84 of the brake arm and onto the arcuate surface 86 thereof. Consequently, the spring 80 is now able to pivot the brake arm in a counter-clockwise direction so as to turn the brake member 58 in this same direction to thereby cause the inclined surfaces 62 thereon to ride up on the inclined surfaces 64, thus displacing the brake member axially to the left, as viewed in Fig. 2. This applies braking force to the ratchet 52 so that the latter is now fixed.

If it is desired to have the electric cord under tension at all times, so that the reel will take up slack, as the vacuum cleaner or the like is moved closer to the outlet to which the plug 106 is attached, the button 70 is depressed as soon as the plug has been inserted in the outlet. In the manner above described, this releases the brake on the ratchet, thus permitting the reel to be rotated under the influence of the spring 38. Consequently, the reel tends to wind up the cord and is prevented from doing so only by virtue of the fact that the plug 106 is attached to an outlet. Hence, if the reel is moved closer to the outlet, it will take up any slack in the cord.

If for any reason it is desired to have the brake under the control of the button 70 during the entire rewinding, the lever 96 may be pivoted in a counter-clockwise direction so as to bring the nose 102 into engagement with the surface 104 on the lever 72. As above described, this prevents pivoting of the lever 72 in a clockwise direction and hence prevents the end of the arm 78 from moving into engagement with the radial surface 84. Thus, the brake arm will not be locked in brake releasing position, but will be pivoted in a counter-clockwise direction so as to apply the brake as soon as pressure on the button 70 is relieved. Thus, the operator may stop the rewinding at any time and may control the speed at which the cord is rewound by regulating the pressure applied to the button 70.

Even with the lever 96 in the position shown in Fig. 1, the same result may be obtained if the button 70 is not depressed sufficiently so that the arm 78 can move down into contact with the radial surface 84. Obviously, as long as the arm 78 is on the arcuate surface 86, the brake arm 60 will not be locked and can be pivoted in a counter-clockwise direction by the spring 80 whenever pressure on the button 70 is reduced.

While I have shown and described one more or less specific embodiment of my invention, it is to be understood that this has been done for purposes of illustration only and that the scope of my invention is not to be limited thereby, but is to be determined from the appended claims. Certain structure disclosed but not claimed herein constitutes an invention of Paul Ruttkay, and is disclosed and claimed in application Serial No. 535,807 filed by him on May 16, 1944.

What I claim is:

1. In a cord winder, a reel, a cord having an enlarged portion, means tending to rotate said reel in a direction to wind the cord thereon, braking means for restraining rotation of said reel, means operable by a single manual impulse for releasing said braking means, and means operable by an impulse imparted thereto by said enlarged portion for applying said braking means.

2. In a cord winder, a reel, a cord having an enlarged portion, means tending to rotate said reel in a direction to wind the cord thereon, braking means for restraining rotation of said reel, a member movable for applying and releasing said braking means, means manually operable to move said member to brake releasing position, means for retaining said member in said position, and means operable by an impulse imparted thereto by said enlarged portion for releasing the retaining means and moving said member to brake applying position.

3. In a cord winder, a reel, a cord having an enlarged portion, means tending to rotate said reel in a direction to wind the cord thereon, braking means for restraining rotation of said reel, a member movable for applying and releasing said braking means, a spring for biasing said member into brake applying position, means manually operable against the force of said spring to move said member to brake releasing position, means for retaining said member in said position, and means operable by an impulse imparted thereto by said enlarged portion for releasing the retaining means to thereby enable said spring to move said member to brake applying position.

4. In a cord winder, a reel, a cord having an enlarged portion, means tending to rotate said reel in a direction to wind the cord thereon, pawl and ratchet mechanism for restraining rotation of said reel in said direction, means operable by a single manual impulse for rendering said mechanism ineffective to restrain said rotation, and means operable by an impulse imparted thereto by said enlarged portion for rendering said mechanism effective to restrain said rotation.

5. In a cord winder, a reel, a cord having an enlarged portion, means tending to rotate said reel in a direction to wind the cord thereon, pawl and ratchet mechanism for restraining rotation of said reel in said direction, a movable member for selectively rendering said mechanism effective and ineffective to restrain said rotation, means manually operable to move said member to a position rendering said mechanism ineffective, means for retaining said member in said position, and means operable by an impulse imparted thereto by said enlarged portion for releasing the retaining means and moving said member to a position rendering said mechanism effective.

6. In a cord winder, a reel, a cord having an enlarged portion, means tending to rotate said reel in a direction to wind the cord thereon, pawl and ratchet mechanism for restraining rotation of said reel in said direction, a movable member for selectively rendering said mechanism effective and ineffective to restrain said rotation, a spring for biasing said member to a position rendering said mechanism effective, means manually operative to move said member against the force of said spring to a position rendering said mechanism ineffective, means for retaining said member in said position, and means operable by an impulse imparted thereto by said enlarged portion for releasing the retaining means to thereby enable said spring to move said member to a position rendering said mechanism effective.

7. In a cord winder, a reel, a cord, means tending to rotate said reel in a direction to wind the cord thereon, braking means for restraining rotation of said reel, a member movable to apply and release said braking means, means biasing said member in a direction to apply said braking means, a manually operable control element for moving said member against the force of the biasing means to release said braking means, a pivoted lever arranged to latch said member in brake releasing position, and means for pivoting said lever out of latching engagement with said member to thereby enable said biasing means to move said member to apply said braking means.

8. In a cord winder, a reel, a cord having an enlarged portion, means tending to rotate said reel in a direction to wind the cord thereon, braking means for restraining rotation of said reel, a member movable to apply and release said braking means, means biasing said member in a direction to apply said braking means, a manually operable control element for moving said member against the force of the biasing means to release said braking means, a pivoted lever arranged to latch said member in brake releasing position, and an element connected to said lever and positioned to receive an impulse from said enlarged portion for pivoting said lever out of latching engagement with said member to thereby enable said biasing means to move said member to apply said braking means.

9. In a cord winder, a casing having an opening, a reel in said casing, a cord extending through said opening and having an enlarged portion outside said casing, means tending to rotate said reel in a direction to wind the cord thereon, braking means for restraining rotation of said reel, a member movable to apply and release said braking means, means biasing said member in a direction to apply said braking means, a manually operable control element for moving said member against the force of the biasing means to release said braking means, a pivoted lever arranged to latch said member in brake releasing position, and a resetting element connected to said lever and movable to pivot said lever out of latching engagement with said member to thereby enable said biasing means to move said member to apply said braking means, said resetting element having a portion adjacent to the opening through which said cord extends, the size of said enlarged portion being sufficient to cause the latter to strike and move the resetting element.

ARNOLD H. BEEDE.